United States Patent [19]

Cooper

[11] 4,261,847
[45] Apr. 14, 1981

[54] REFRIGERANT COMPOSITIONS

[75] Inventor: William D. Cooper, Hockessin, Del.

[73] Assignee: E. I. du Pont de Nemours and Company, Wilmington, Del.

[21] Appl. No.: 51,898

[22] Filed: Jun. 25, 1979

[51] Int. Cl.³ .......................... C09K 5/02; C09K 5/04
[52] U.S. Cl. ...................................... 252/67; 62/162; 252/162; 252/171
[58] Field of Search .................. 252/162, 171, 67; 62/162

[56] References Cited

U.S. PATENT DOCUMENTS

| | | | |
|---|---|---|---|
| 2,531,373 | 11/1980 | Waterman | 252/67 |
| 2,641,579 | 6/1953 | Benning | 252/67 |
| 2,938,362 | 5/1960 | Schwind | 62/149 |
| 3,336,763 | 8/1967 | Lunde | 252/67 X |
| 3,418,242 | 12/1968 | Eiseman, Jr. | 252/67 |

FOREIGN PATENT DOCUMENTS 645096  10/1950  United Kingdom .

OTHER PUBLICATIONS

Jakobs et al., International Journal of Refrigeration, vol. 2, No. 1, Jan. 1979, pp. 29-33.
McHarness et al., Ashrae Journal, vol. 4, No. 1, p. 49 (Jan. 1962).
Saluja et al., Refrigeration Air Conditioning, pp. 80-86, 113 (Mar. 1978).

Primary Examiner—Mayer Weinblatt
Attorney, Agent, or Firm—F. J. Crowley

[57] ABSTRACT

A composition useful as a refrigerant comprising a mixture of bromotrifluoromethane (R-13B1) and 1,1-difluoroethane (R-152a).

2 Claims, 1 Drawing Figure

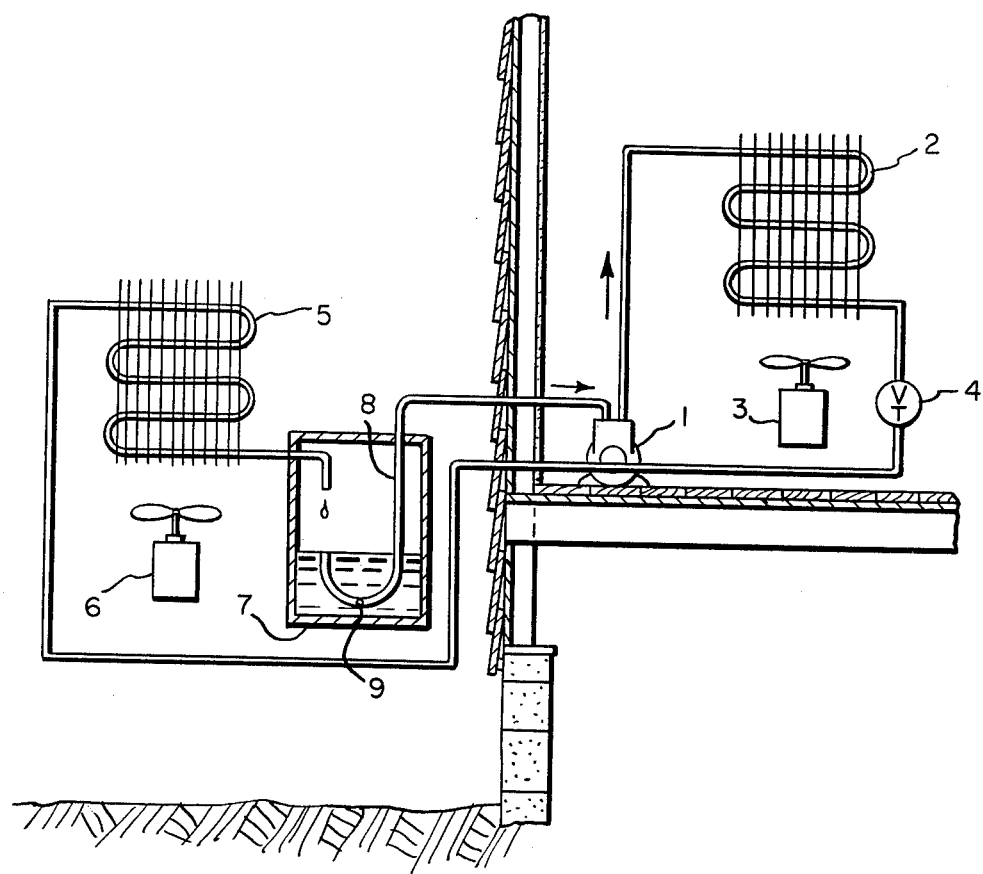

REFRIGERANT COMPOSITIONS

BACKGROUND OF THE INVENTION

This invention pertains to new compositions of matter comprising mixtures of bromotrifluoromethane and 1,1-difluoroethane which are useful as refrigerants, particularly as refrigerants in heat pumps.

In recent years, there has been an increase in the popularity of heat pumps to cool homes in the hot weather and to provide heat during the colder months. When a heat pump functions in a cooling mode, it operates on the same basic principle as does a conventional air-conditioner. Refrigerant is circulated through the system by a compressor, and it alternately absorbs and releases heat as it is vaporized and condensed in the course of its circulation around the circuit. Heat from the indoors is absorbed by the refrigerant as it vaporizes in the evaporator situated within the home or other space where cooling is desired, and this absorbed heat is ultimately released to the outside atmosphere when the refrigerant gas is compressed into the condenser which is in contact with the outside air. The absorbed heat is released as the refrigerant gas liquifies in the condenser. In the winter, a home or other type of building can be heated by reversing the flow of the refrigerant whereupon the condensor and evaporator switch roles. The coils that serve as a condenser and release heat in summer serve as the evaporator and the refrigerant absorbs heat from the outside atmosphere as it evaporates. This heat is then released indoors when the gas condenses. The most commonly used refrigerant for heat pumps is chlorodifluoromethane which is known in the industry as Refrigerant 22 or simply R-22.

One of the deficiencies in the performance of heat pumps for heating purposes is that they tend to lose their capacity to provide heat as the outside temperature gets colder. Because of the lower temperature at the evaporator the refrigerant will evaporate more slowly, and the less vaporization, the less absorption of heat for transfer to the indoors. In severe cold weather, the rate at which the refrigerant will vaporize in the outdoor evaporator will be low, and the compressor will consume disproportionately more electricity to compress the same amount of gas into the indoor condenser. Since heat pumps tend to lose capacity in this manner, they are used mostly in areas where winters are relatively mild, or they are used in conjunction with a supplementary heating system such as coal, oil or gas-fired heat or electrical resistance heating.

Various means have been suggested for minimizing the loss of capacity in a heat pump in colder weather. For example, a refrigerant having a relatively high vapor pressure will vaporize more readily than one with a lower vapor pressure, and thus the use of refrigerant with a higher vapor pressure in cold weather will facilitate vaporization. On the other hand, such a refrigerant can build up excessive pressure in the system in warmer weather when the pump is being used to cool. While it would be possible to employ a refrigerant with a relatively high vapor pressure in winter and then change to one with a lower vapor pressure in summer, this is not considered to be a convenient or practical solution to the problem. A similar but more convenient method of minimizing capacity fall off is suggested in U.S. Pat. No. 2,938,362 which employs a mixture of dichlorodifluoromethane (R-12) and bromotrifluoromethane (R-13B1), a refrigerant known for its relatively high vapor pressure. According to the patent, this mixture is employed in a heat pump equipped with a reservoir and rectifying column which increases or decreases the proportion of R-13B1 in the active refrigerating circuit as the need arises. When a higher proportion of the refrigerant of higher vapor pressure is needed in the circuit to facilitate vaporization in the evaporator, an electrical heater in the reservoir and a valve mechanism are activated in response to decreased energy consumption by the compressor motor, due to decreasing capacity. In this way, refrigerant, enriched in R-13B1 which has a higher vapor pressure, is distilled through the rectifying column into the active refrigerating circuit. At the same time, an equal volume of the circulating refrigerant stream, which is less rich in the refrigerant of higher vapor pressure, enters the reservoir where it no longer participates in the refrigeration process. As a result of the introduction of additional R-13B1, the pressure at the suction side of the compressor and thus the capacity of the system is increased over that which would prevail if the refrigerant mixture was not enriched in R-13B1. When the pressure becomes too high as the temperature at the evaporator increases thus giving an increase in capacity beyond that needed, a control means responsive to increased energy consumption connects the active refrigerating circuit in series with the rectifying column and the reservoir, and the refrigerant mixture in these auxiliary devices is added to the circuit to provide an active refrigerating mixture no longer enriched in the refrigerant of higher vapor pressure.

SUMMARY OF THE INVENTION

It is the object of the present invention to provide a refrigerant mixture containing bromotrifluoromethane (Refrigerant 13B1) which is adapted to automatically adjust its bromotrifluoromethane content in a conventional heat pump system as the need for a refrigerant of greater or lesser vapor pressure arises. This objective is accomplished by compositions of matter comprising a mixture of about 50 to 70% by weight of bromotrifluoromethane (R-13B1) and about 50 to 30% by weight of 1,1-difluoroethane (R-152a). In a more preferred embodiment, the compositions comprise about 60% wt % R-13B1 and 40% wt % R-152a. Test of this composition described in the specific examples are considered to establish that refrigerant mixtures of these two materials can be used in conventional heat pump systems, and that they will become enriched in the higher vapor pressure R-13B1 as temperatures at the evaporator decrease and reduced in R-13B1 content as the pressure in the system increases. While this adjustment of R-13B1 content wll not completely eliminate the fall off of capacity at reduced temperatures or cause a heat pump to function at extremely low temperatures, the use of the refrigerant mixture of this invention provides a means for reducing the problem.

DESCRIPTION OF THE DRAWING

To illustrate the use of the compositions of this invention, reference is made to drawing which shows the principal elements of a conventional heat pump system.

In functioning as a heating system, compressor 1 compresses the gaseous refrigerant mixture into condenser 2 where the refrigerant mixture liquifies giving off heat which is distributed to the inside of the house by means of fan 3. Liquid refrigerant mixture leaving condenser 2 is throttled through expansion device 4, preferably a capillary as is common in the art to the evaporator 5 outside the house. In evaporator 5, refrigerant mixture evaporates, taking up heat from the air being blown over evaporator 5 by fan 6. A part of the refrigerant mixture will remain liquid at low outside temperatures and will collect in reservoir 7. Means normally should be provided for returning refrigeration oil in reservoir 7 to the active refrigeration circuit. A suitable art known device employs a J-shaped exit tube 8 having a capillary opening 9 at its lowest point for returning liquid refrigerant and oil to the circuit.

The collected liquid refrigerant mixture will be enriched in R-152a, the component of lower vapor pressure relative to R-13B1, by an amount equivalent to one distillation equilibrium stage. The gaseous refrigerant mixture, having a higher pressure because of enrichment in R-13B1, enters the suction side of compressor 1. The higher pressure at the suction side of the compressor results in leveling, that is, an increase in capacity over that which would have prevailed had liquid refrigerant enriched in R-152a not collected in the reservoir.

With rise in the temperature at the evaporator, the process reverses, This comes about when the refrigerant mixture becomes superheated in the evaporator, i.e., it absorbs more heat than is needed for total evaporation, and carries this superheat into the reservoir causing the refrigerant mixture collected there to evaporate and join th circulating refrigerant mixture. The reversal of the leveling process prevents undesirable rise in condenser pressures with rising temperature.

As previously mentioned, most commercial heat pumps currently available are designed to operate with Refrigerant 22. While it should be expected that the refrigerant compositions of the present invention are capable of giving some desired degree of leveling in such devices having a reservoir between the evaporator and the compressor, optimum results would be obtained by sizing the components, i.e., the condenser, evaporator and expansion device to fit the needs of this particular refrigerant as is customary when adapting a system to use a particular refrigerant. The size of the reservoir should be such that about one-half the total refrigerant volume as liquid can be contained therein. However, in localities having relatively mild winters, a reservoir of lesser volume could be selected. The expansion device should be sized so that liquid refrigerant begins to collect in the reservoir at the temperature of the evaporator at which leveling of capacity is desired. This is usually at an outside temperature of about 8° C. A conventional capillary tube is the preferred expansion device. If commencement of leveling is desired at a relatively high temperature, then a short tube is employed and vice versa. Once the capillary tube is in place, the device levels automatically; a decline in temperature at the evaporator to a predetermined level will cause unevaporated refrigerant mixture to pass through the evaporator and collect in the reservoir, thus beginning the leveling process. Other art known expansion devices such as manually adjustable valves can be used.

Refrigerant mixtures containing from about 50% wt to about 70% (wt) R-13B1 are operable. Mixtures containing more than about 70% (wt) R-13B1 have somewhat too high pressures for ordinary equipment. Also distillative separation of components and hence levelling is less effective at these high concentrations. Mixtures containing 45% (wt) or less R-13B1 can be flammable when released into air. For the sake of safety, mixtures containing less than 50% (wt) R-13B1 are not recommended.

The following examples further illustrate the invention.

EXAMPLE 1

This example compares capacity levelling in an equal weight mixture of R-13B1 and R-152a of the present invention with a prior art composition containing equal weights of R-13B1 and R-12.

A test heat pump device was employed having the basic design shown in the drawing. This device was fitted with instruments permitting the measurement of heat absorption capacity under defined conditions. The temperature at the evaporator was fixed at 4.4° C. by means of a secondary refrigerant (R-12) contained in an enclosure surrounding the evaporator. Resistance heaters, responsive to pressure changes in the enclosure, maintained the temperature constant. Capacity was measured by the use of a watt-hour meter connected to the heaters.

The amount of refrigerant mixture charged was selected in each case to fix the temperature of the refrigerant mixture entering the evaporator at $-5.1°$ C.$\pm 0.7$. The reservoir, calibrated to hold 1 kg of the refrigerant of this invention, was fitted with a glass window permitting observation of the refrigerant collected in the reservoir. The condenser was cooled with a flow of tap water adjusted so as to fix the temperature of the refrigerant mixture entering the expansion valve at 42.8° C.$\pm 1.1°$ C.

In a first set of trials, the comparative enrichment of R-13B1 in the refrigerant mixture in the active refrigerating circuit was measured in the composition of this invention and in the prior art mixture on collection of equal volume of the refrigerant mixture in the reservoir.

In the first trial of the mixture of this invention, an equal weight mixture of R-13B1 and R-152a of the invention weighing 2.0 kg, an amount selected on the basis described above, was charged to the evacuated device. With the compressor running, the condenser cooling water was adjusted also as described above. The expansion valve was manually adjusted so that the reservoir is just filled. At steady state, a sample of the circulating refrigerant mixture was removed and analyzed. It was found to contain 64.5% (wt) of R-13B1 by gas chromatography. Thus, the composition at steady state was considerably enriched in R-13B1.

In a parallel trial of the prior art mixture, an equal weight mixture of R-13B1 and R-12 weighing 2.5 kg was charged and tested in the same way. Analysis of the circulating refrigerant mixture showed it to contain 57.0% (wt) R-13B1.

In a second set of trials the capacities of 50/50 and 70/30 (wt) mixtures of R-13B1/R-152a of this invention and R-13B1/R-12 of the prior art were measured with the reservoir empty. The expansion valve was adjusted to the point of incipient collection of refrigerant mixture in the reservoir. This produced the so-called "no superheat" condition which ensures that the whole length of the evaporator is used to evaporate refrigerant. The results are shown in the table.

TABLE

| Refrigerant Mixture | Charge (kg) | Refrigerant Temp. (°C.) At Evap. | At Expan. Valve | Capacity (kW) |
|---|---|---|---|---|
| R-13B1/R-152a 50/50 (wt) | 1.98 | −4.4 | 43.9 | 1.37 |
| R-13B1/R-152a 70/30 (wt) | 1.99 | −5.6 | 42.8 | 1.78 |
| R-13B1/R-12 50/50 (wt) | 2.56 | −5.0 | 42.5 | 1.67 |
| R-13B1/R-12 70/30 (wt) | 2.50 | −5.6 | 41.9 | 1.81 |

The table shows directly the capacities of the 50/50 (wt) and 70/30 (wt) mixtures in the empty reservoir mode. Knowing the capacities of the above 70/30 (wt) and 50/50 (wt) mixtures, it is possible to calculate by interpolation the capacities when the reservoir was completely filled, since the corresponding compositions of the refrigerant mixtures in the active refrigerating circuit are known from the first set of trials. This calculation shows that the capacity of the invention mixture is raised to a proportionately greater degree than is the prior art mixture upon collection of equal volumes of refrigerant in the reservoir. Thus the capacity of the invention mixture was shown to have risen from 1.37 kW to 1.67 kW, a 22% increase whereas the prior art mixture rose from 1.67 kW to 1.69 kW, an increase of 1.2%.

EXAMPLE 2

This example demonstrates that a composition of the invention can be employed in a commercial air-conditioner with results closely parallel to those obtained with R-22.

A White Westinghouse model AH107WIDI ATM 22806 window air-conditioner was tested in a so-called room calorimeter in which the "outside" conditions were fixed at 35° C. dry bulb temperature and 50% relative humidity and the "inside" conditions were fixed at 26.6° C. dry bulb temperature and 50% relative humidity.

The conditions and results were as follows:

|  | Prior Art | Invention |
|---|---|---|
| Refrigerant Composition | R-22 | 55% (wt) R-13B1 45% (wt) R-152a |
| Refrigerant Charge (g) | 496 | 567 |
| Power Consumption (kW) | 1.41 | 1.36 |
| Dehydration (kg/h H$_2$O) | 1.4 | 1.3 |
| Cooling, Total (kW) | 2.85 | 2.72 |
| Sensible Cooling (%) | 67.4 | 67.7 |
| Coefficient of Performance | 2.02 | 2.00 |
| Evap. Temp. ½ Way (°C.) | 8.9 | 9.4 |
| Suction Line Temp. (°C.) | 16.7 | 18.9 |

EXAMPLE 3

This example demonstrates that a composition of the invention can be employed in an unmodified commercial heat pump in both the heating and cooling modes with acceptable results.

A York heat pump model No. CHP024 of nominal 7.03 kW heating and cooling capacity was tested with its design charge of 200 g of R-22 (23.13 g mol) under standard air conditioning test conditions and under two sets of heating conditions. Thereafter the R-22 refrigerant was replaced with a 60/40 (wt) invention mixture of R-13B1/R-152a and the tests were repeated. The charge of invention refrigerant (256 g 28.85 g mol) was selected, after preliminary trials, to give maximum cooling capacity.

In the air conditioning test the "outside" conditions were fixed at 35° C. dry bulb temperature and the "inside" conditions were fixed at 26.6° C. dry bulb temperature. Relative humidity was fixed at 50% in both cases.

In the heating tests "outside" conditions were fixed at +8.3° C. and −8.3° C. with relative humidity fixed in each case at 70%. The "inside" condition was 21.1° C. and relative humidity was uncontrolled.

The results were the following:

|  | Prior Art R-22 | Invention Mixture |
|---|---|---|
| Air Conditioning | | |
| Power consumption (kW) | 3.07 | 2.88 |
| Cooling, Total (kW) | 7.13 | 5.00 |
| Coefficient of Performance | 2.32 | 1.74 |
| Heating (outside temp. + 8.3° C.) | | |
| Power consumption (kW) | 2.49 | 2.58 |
| Capacity (kW) | 7.54 | 7.01 |
| Coefficient of Performance | 3.03 | 2.72 |
| Heating (outside temp. − 8.3° C.) | | |
| Power consumption (kW) | 2.06 | 2.21 |
| Capacity (kW) | 4.29 | 4.26 |
| Coefficient of Performance | 2.09 | 1.92 |

I claim:

1. A composition of matter consisting essentially of about 50 to 70% by weight of bromotrifluoromethane and about 50 to 30% by weight of 1,1-difluoroethane.

2. The composition of claim 1 in which there is about 60% by weight of bromotrifluoromethane and about 40% by weight of 1,1-difluoroethane.

* * * * *